Sept. 3, 1946.  N. E. WALKER  2,406,873
ELECTRICALLY OPERATED CONTROL
Filed Nov. 9, 1942
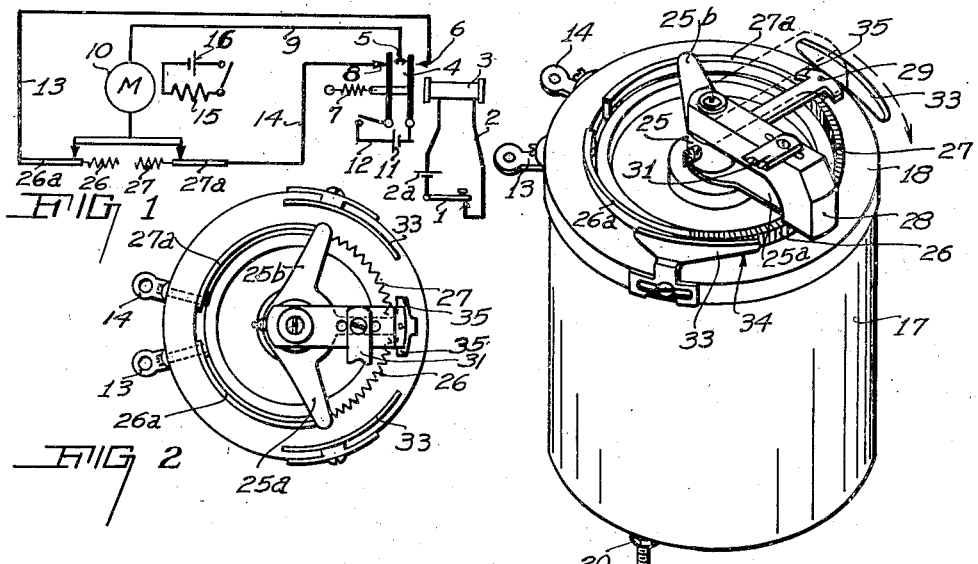
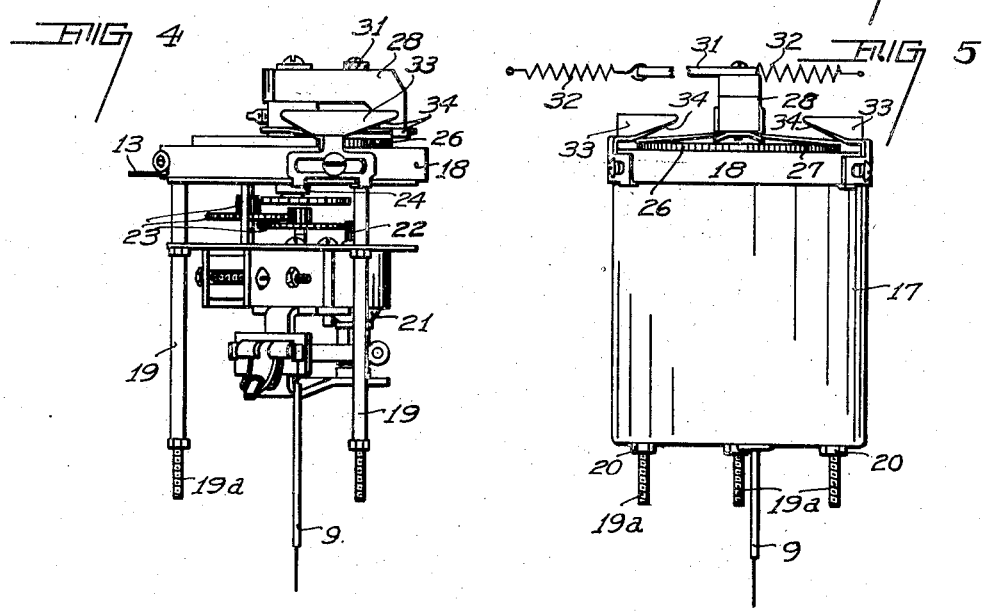
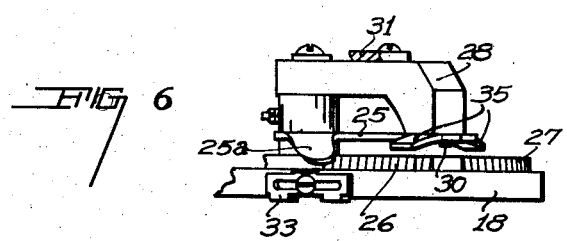
INVENTOR
NEVILLES E. WALKER
BY
ATTORNEY Patented Sept. 3, 1946

2,406,873

UNITED STATES PATENT OFFICE 2,406,873

ELECTRICALLY OPERATED CONTROL

Nevilles E. Walker, Portland, Oreg.

Application November 9, 1942, Serial No. 464,990

7 Claims. (Cl. 192—.02)

My invention relates to a device which is capable of distant electrical control so as to position devices or otherwise to control them, quickly and accurately. As an example, said device is particularly adapted to control the flight of radio controlled airplanes, projectiles and similar devices, from a distance. In connection with this specific use, it is essential that the flight of said devices be held within close limits and be susceptible of instant change in direction. To this end, my invention has particular application in connection with the devices described in my co-pending application for patent, entitled Distant control, filed October 15, 1941, Serial No. 415,109.

A further object of my invention is to provide a control of this character which can be actuated by a series of electrical impulses, preferably transmitted by radio, which controls will respond accurately to said impulses. If other and counter impulses are imposed on said control, the operative control is not taken over but the devices will be held in a pre-determined position. Thus, if my invention is embodied in radio controlled airplanes or aerial torpedoes in warfare, said devices may be controlled from a distance. If an enemy seeks to take over the controls by imposing on said control stronger impulses of proper frequency, or if the signal for effecting control is otherwise disturbed, the controls will lock said airplane or aerial torpedo to a course along which said device will continue in straight-away flight and at top speed.

Other and further details of my invention are hereinafter described with reference to the accompanying drawing, in which:

Fig. 1 is a diagrammatic view of the electrical circuits used in connection with said electrically operated control;

Fig. 2 is a plan view of said control unit;

Fig. 3 is a perspective view of said control unit with portions shown in dotted outline to indicate the manner in which a contact arm may be disengaged and moved to a central position in case the control signals are blanketed or otherwise rendered ineffective;

Fig. 4 is an elevation of the actuating parts of said control unit shown removed from the container therefor;

Fig. 5 is an elevation of said control unit with centering springs shown diagrammatically; and Fig. 6 is a fragmentary view of the contact arms and release mechanism embodying my invention.

I shall describe the operation of my invention as it would be used in connection with the control of a distant airplane or aerial torpedo, because it is for this use that I have specifically designed said apparatus. In the control of such a device, it is desirable that such devices shall occupy definite positions to affect the flight thereof. This should be so, independent of the strength of the signals received. Said device is adapted to be actuated by interrupted electric impulses and said impulses preferably are given out by a motor-driven or otherwise mechanically actuated make-and-break.

In Fig. 1, I diagrammatically illustrated said interrupted signals as being produced by a manually operated key 1, which opens and closes circuit 2 for electro-magnet 3. Said circuit is energized by some source of energy, diagrammatically illustrated as battery 2a. In practice, however, a device will be used such as is described in detail in my said co-pending application for patent, Serial No. 415,109, previously referred to. When said circuit 2 is energized, the electro-magnet 3 will actuate relay 4 and will hold the armature of said relay against contact points 5 and 6. When said electro-magnet 3 is de-energized, the spring 7 will cause said relay armature to engage contacts 5 and 8 in the manner shown in Fig. 1. Thus, the interrupted electric impulses will be transmitted through said relay in synchronism and in duration with the closing of key 1.

Contact 5 is in the power lead 9 to motor 10, and said lead is energized in both throws of relay 4. Said relay is energized by a source of power indicated as battery 11 connected in the circuit 12 leading to said relay. Said relay is preferably of the double-pole, double-throw type. Contact 6 is electrically connected in lead 13 connected to one side of motor 10, and lead 14 extending to the opposite side of said motor is electrically connected with contact 8. When current flows through circuit 13, it causes the motor to rotate in one direction and when current flows through circuit 14, it produces reversal in rotation of said motor. I have shown motor 10 as having a separately excited field 15 energized by battery 16. If desired, a permanent magnet field might be used or any other arrangement whereby the motor will reverse the power of its supply. Thus, the armatures of relay 4 will be pulled towards the right by the magnetic pull of electro-magnet 3, and would be pulled in the opposite direction by spring 7. In its right-hand position, relay 4 serves to connect battery 2a to motor 10 to cause rotation in one direction. Then, during the interval between impulses, the relay armatures are pulled to the left by spring 7 and the polarity is reversed, causing said motor to tend to reverse. I prefer to provide several spaced impulses per second so that the motor 10 will tend to reverse several times per second, and if its rotor be sufficiently light in weight, it may actually reverse at this rate.

In Fig. 4, I illustrate the mechanical structure of said control unit. The control unit, preferably, is mounted within a container 17 having a top 18 removably secured thereto by rods 19 having nuts 20 on the threaded ends 19a thereof. Thus, the container which houses the mechanism, as illustrated in Fig. 5, may be removed so that the interior may be exposed, in the manner shown in Fig. 4. The rotor 21 has a pinion 22 secured directly to the shaft thereof, and a train of gears 23 operatively drives spindle 24 to which rotatable contact arm 25 is secured.

If the key 1 is closed at such a rate that the duration of contacts is equal to the interval between them, then motor 10 would merely oscillate slightly without a net rotation in either direction. If contacts are longer than the intervals between them, then the motor will rotate in the direction in which it tends to rotate during the closing of the circuit. On the other hand, if the impulses be made shorter than the intervals between them, then the motor will rotate in the opposite direction.

As thus far described, my invention will not serve my purpose of providing an automatic remote control device effectively, because the motor 10 will not automatically come to rest and it would be necessary for the operator consciously to stop the motor. However, I provide variable resistors 26 and 27, one of which is introduced in series with motor 10 by lead 13, and the other resistor is connected in the motor circuit by lead 14. Rotatable contact arm 25 has two branch arms 25a and 25b. The branch arm 25a is adapted to make contact with variable resistor 26 or its bus bar 26a. Branch arm 26b of the rotatable contact arm is adapted for electrical connection at all times with the variable resistor 27 with its bus bar 27a. Said branch arms are spaced apart a distance substantially equal to the physical length of the resistors 26 and 27 combined, plus the space between them. Bus bars 26a and 27a are connected in series with resistors 26 and 27, respectively, and the ends of branch arms 25a and 25b, respectively, are adapted to make constant contact with said resistors or said bus bars.

Suppose, therefore, that motor 10 is started when the rotatable contact arm is in its central position, as is shown in Fig. 2. Then, if long impulses predominate over shorter intervals between impulses, the motor will be caused to rotate in a certain direction. As said motor rotates, more and more resistance will be introduced into its power circuit until it comes to rest. The place where it comes to rest is determined by the length of the impulses with relation to the length of the interval between them. In this manner, a control is effected over the rotation of said motor. Of course, an exactly opposite result would be obtained if the impulses were shorter than the intervals between them. Motor 10 would then rotate in the opposite direction because the battery 11 would be connected to it oppositely by relay 4 for a majority of the time, and the net rotative force necessary to rotate the motor would be effective until enough resistance is connected in series to stop the movement thereof. The net rotative force applied to said motor depends upon the relative length of impulses and intervals between impulses. When one predominates over the other, then the amount of motor rotation is determined by said net rotative force until it is balanced by the amount of resistance interposed to equalize said net rotative force.

When the rotatable contact arm 25 comes to rest, as it does when said balance has been reached, it may be moved to another position by varying the relation between the length of the impulses to the length of the intervals between them.

Although the variable resistors 26 and 27 are shown separated and spaced apart at their adjacent ends, they may be joined together without changing the normal operation of the structure. The juncture thus formed would be short circuited by either of the branch arms 25a or 25b. I deem it desirable that the rotatable control arm have two branches because if this were not so, there would always be some resistance present in series with motor 10, as it is rotated and the moving of the rotatable contact arm 25 towards its middle position would be unnecessarily sluggish. By arranging said arms with their contact points in electrical connection with the variable resistors, and spaced apart a distance substantially equal to the physical length of the resistors and the space between them combined, said branch arms span said resistors when the contact arm is at its mid point, as is shown in Fig. 2. At this point, there is no resistance in series with the motor in either throw of the relay 4. When said branch arms move away from said mid point, they maintain contact with the bus bars which have negligible resistance, and thus the circuit thus made through a branch arm and bus bar is substantially without resistance.

Proper functioning of said control unit requires that the rotation of the motor 10 as it moves contact arm 25 from its mid point, shall be self-limiting by the introduction of resistance in said power circuits, as has been described. Otherwise, the control unit will not be automatic.

I will now describe a different advantage of said control unit. Said control unit will faithfully follow the relation which exists between lengths of impulses to length of intervals between impulses, as long as said control unit is not required to move an unduly large mechanical load. The rotation of the motor is transmitted through a rotatable arm 28 journalled on the top of the container 17. Said rotatable arm is driven by a clutch mechanism which joins said arm to the rotatable contact arm 25. Said rotatable contact arm is preferably made of some resilient material so as to be springy and the arm is provided with a hole 29 which is adapted to be engaged by a pin 30 extending downwardly from the rotatable arm 28. When said rotatable arm 28 is in alinement with the contact arm 25, then said pin 30 fits in the hole 29 and said two arms move together as a unit.

A device to be controlled such, for example, as a control for an airplane or other device, is diagrammatically shown as made through a link 31, a fragment of which is shown in the several drawings. Said rotatable arm tends to be centered at all times by opposed springs 32. In practice, said springs are not connected directly to the rotatable arm 28, but are connected to some controlled device. Merely for illustration, said springs are shown diagrammatically as connected directly to said arm 28 in Fig. 5. If an unduly large mechanical load is imposed upon said rotatable arm 28 so as to produce lag, it will not destroy the precision of a control unit embodying my invention, because the contact arm 25 is designed to be in a middle position when impulses are in equal length of time to intervals. If said abnormal load should cause the contact arm 25 to be in a false position, it will tend to move to its middle position since the two circuits tending to rotate the motor 10 in opposite directions will be connected to said motor for equal times. One of the circuits, however, will include resistance; whereas the other will be without resistance. Thus, the rotative force of the one without resistance will predominate over that including resistance and will move the contact arm 25 to its middle position. Thus, for example, if said control unit is used for controlling the flight of a distant airplane and said control unit should fail briefly to correspond to its intended behavior and assume temporarily a false position, it will automatically be corrected and moved to a true position each time it passes the mid point because of the balancing of said circuits and the resistances included therein.

It is desirable that the movement of the operating controls be limited to their useful range. It is a matter of considerable difficulty to accomplish this result without disturbing the position of the branch arms with respect to the variable resistance and bus bars connected therewith. Because of the fact that the rotatable arm 28 is connected to the contact arm 25 by clutch mechanism as described, I am able to disconnect said members at the limits of their useful range. The disconnection of said clutch mechanism is accomplished by providing two spaced lugs 33 with the cam faces 34 on their under surfaces. Thus, when the extremity 35 of rotatable contact arm 25 approaches the limit of its desired level, as illustrated in Fig. 3, said extremity is slightly depressed by the cam face of a lug thereby to disengage pin 30 from hole 29. This permits the rotatable arm 28 to be moved by springs 32 to a middle position. This automatically connects whatever control device is connected with said arm through the links 31 to a position corresponding to middle position of contact arm 25. While the arm 25 is out of engagement with arm 28, the device being controlled is free of control from the unit. When the rotatable contact arm is moved to mid position by sending impulses of a length equal to intervals between them, then said contact arm 25 is swung to mid position. The end 35 of the rotatable contact arm 25 is curved downwardly and guides pin 30 over the top of said end so as to come into engagement with contact arm 25 by said pin-and-hole clutch arrangement. The pin-and-hole connection thus serves as a clutch mechanism which is automatically disengageable at the limits of travel by the cam faces of lugs 33. Connection is automatically made at mid point by the curved end 35 moving under the extremity of pin 30 to permit re-engagement. Because of the fact that the adjacent ends of variable resistors 26 and 27 are spaced apart slightly, it is possible that one of the branch arms may move into alinement with said space and break the circuit actuating motor 10. Said motor will thus not rotate further away from its mid position, although it will rotate in the opposite direction because the other arm is in electrical connection with the bus bar at that side of the control unit. The stoppage of motor 10 and disengagement of the pin-and-hole connection may permit the contact arm 25 to assume a false position with respect to the relative length of impulses to intervals, but the parts will move into correct position as soon as re-engagement is made through said clutch mechanism.

These features of my invention are important if said control unit is adapted to be used to control airplanes or aerial bombs in warfare. An enemy may seek to disturb the operation of such control unit by sending forth strong signals which will blanket out the signals sent by operation of key 1 or automatic equipment described in my co-pending application. It is also possible that control may be lost by signal failures due to failure of apparatus. In such case, I prefer that the elements controlled through the link 31 will tend to be moved to a point corresponding to mid position of the contact arm 25. This might correspond to the setting of controls at which an aircraft or aerial bomb would be directed to straight ahead, level flight, and at full speed. In either of the situations stated; that is, loss of control due to apparatus failure or due to blanketing, the control unit will tend to move until one of the limits is reached. At said point, the rotatable arm 28 will be released from the pin-and-hole connection with contact arm 25 and springs 32 move said rotatable arm 28 and the link and connected mechanism to mid point.

As has been previously pointed out, motor 10 tends to oscillate twice for each impulse, once when the key 1 is closed and once when the key is open. I prefer to produce said impulses at such a high frequency that the reverse rotations will be of brief duration and of slight amplitude. Said reverse rotations must not be so frequent, however, that the relay 4 will not follow the opening and closing action of key 1. It is for this reason that I provide the train of gears 23, which have a high ratio. Thus, slight reversals of the rotor of the motor 10 will be of inconsequential amplitude when transmitted through said trains of gears and other apparatus to the link 31.

I claim:

1. A control including an electrically operated device characterized by being receptive to and energized by interrupted electric impulses, resistance elements in electric series with the power circuits leading to said device, said resistance elements being electrically balanced with respect to each other to maintain said device at any position to which it has been moved, said resistance elements having movable contacts electrically connected with said circuits and physically joined together and to said device, and a self-engaging clutch mechanism adapted operatively to engage said movable contacts when said clutch mechanism is in engaging position.

2. A control including an electrically operated motor characterized by being receptive to and energized by interrupted electric impulses, resistance elements in electric series with two reversely connected power circuits leading to said motor, said resistance elements being electrically balanced with respect to each other to maintain said motor at any angular position to which it has been rotated, said resistance elements having movable contacts electrically connected with said circuits and physically joined together and to said motor, and a self-engaging clutch mechanism adapted operatively to engage said movable contacts when said clutch mechanism is in engaging position.

3. A control including an electrically operated device characterized by being receptive to and energized by interrupted electric impulses, resistance elements in electric series with the power circuits leading to said device, said resistance elements being electrically balanced with respect to each other to maintain said device at any position to which it has been moved, said resistance elements having movable contacts electrically connected with said circuits and physically joined together and to said device, an arm physically joined to a movable part actuated by said device, a self-engaging clutch mechanism carried by said arm and adapted operatively to engage said movable contacts when said clutch mechanism is in engaging position, and means adapted automatically to move said clutch mechanism into disengaging position when said arm moves past a given position.

4. A control including an electrically operated device characterized by being receptive to and energized by interrupted electric impulses, resistance elements in electric series with the power circuits leading to said device, said resistance elements being electrically balanced with respect to each other to maintain said device at any position to which it has been moved, said resistance elements having movable contacts electrically connected with said circuits and physically joined together and to said device, an arm physically joined to a movable part actuated by said device, a self-engaging clutch mechanism carried by said arm and adapted operatively to engage said movable contacts when said clutch mechanism is in engaging position, and a pair of spaced limit members adapted automatically to move said clutch mechanism into disengaging position when said arm moves past either of said spaced limit members.

5. A control including an electrically operated device characterized by being receptive to and energized by interrupted electric impulses, resistance elements in electric series with the power circuits leading to said device, said resistance elements being electrically balanced with respect to each other to maintain said device at any position to which it has been moved, said resistance elements having movable contacts electrically connected with said circuits and physically joined together and to said device, an arm physically joined to a movable part actuated by said device, a self-engaging clutch mechanism carried by said arm and adapted operatively to engage said movable contacts when said clutch mechanism is in engaging position, a pair of spaced limit members adapted automatically to move said clutch mechanism into disengaging position when said arm moves past either of said spaced limit members, and means for returning said arm to a predetermined position when said clutch is moved to disengaging position.

6. A control including an electrically operated device characterized by being receptive to and energized by interrupted electric impulses, resistance elements in electric series with the power circuits leading to said device, said resistance elements being electrically balanced with respect to each other to maintain said device at any position to which it has been moved, said resistance elements having movable contacts electrically connected with said circuits and physically joined together and to said device, an arm physically joined to a movable part actuated by said device, and a self-engaging clutch mechanism carried by said arm and adapted operatively to engage said movable contacts when said clutch mechanism is in engaging position.

7. A control including an electrically operated motor characterized by being receptive to and energized by interrupted electric impulses, resistance elements in electric series with two reversely connected power circuits leading to said motor, said resistance elements being electrically balanced with respect to each other to maintain said motor at any angular position to which it has been rotated, said resistance elements having movable contacts electrically connected with said circuits and physically joined together and to said motor, an arm physically joined to a rotatable part actuated by said motor, a self-engaging clutch mechanism carried by said arm and adapted operatively to engage said movable contacts when said clutch mechanism is in engaging position, a pair of spaced limit members adapted automatically to move said clutch mechanism into disengaging position when said arm moves past either of said spaced limit members, and means for returning said arm to a predetermined position when said clutch is moved to disengaging position.

NEVILLES E. WALKER.